United States Patent
Araya et al.

[15] 3,693,858
[45] Sept. 26, 1972

[54] DEVICE FOR FEEDING A CONSUMABLE WIRE ELECTRODE TO AN ARC WELDING TORCH

[72] Inventors: Takeshi Araya, Tokyo; Tsugio Udagawa, Kawaguchi, both of Japan

[73] Assignee: Hitachi, Ltd., Tokyo, Japan

[22] Filed: July 20, 1971

[21] Appl. No.: 164,288

[30] Foreign Application Priority Data

July 24, 1970 Japan......................45/64281

[52] U.S. Cl..............................226/108, 219/130
[51] Int. Cl. ...................................B65h 17/20
[58] Field of Search ......226/108, 111, 188; 219/130, 219/131 F; 314/69

[56] References Cited

UNITED STATES PATENTS

| | | | |
|---|---|---|---|
| 3,630,425 | 12/1971 | Wilkens | 226/108 |
| 3,586,221 | 6/1971 | Rosen | 226/108 |
| 3,344,305 | 9/1967 | Ogden et al | 226/111 X |

FOREIGN PATENTS OR APPLICATIONS 881,354  11/1961  Great Britain..............226/108

*Primary Examiner*—Allen N. Knowles
*Attorney*—Craig, Antonelli & Hill

[57] ABSTRACT

A device for feeding a consumable wire electrode to an arc welding torch from a wire reel through a flexible conduit tube by means of two wire feeding means of the push and pull types. The wire feeding means of the push type is driven by a motor having a substantially constant torque characteristic, while the wire feeding means of the pull type is driven by a motor having a substantially constant speed characteristic. Specifically, the driving motor for the feeding means of the pull type takes the form of a compressed-air driven motor which, by regulating the flow rate of exhaust air, has a desired constant speed characteristic.

5 Claims, 7 Drawing Figures

A { FEEDING PRESSURE 6 kg/cm² ; BACK PRESSURE 0 kg/cm² }

B { FEEDING PRESSURE 1 kg/cm² ; BACK PRESSURE 0 kg/cm² }

C { FEEDING PRESSURE 6 kg/cm² ; BACK PRESSURE 5 kg/cm² }

INVENTORS

TAKESHI ARAYA AND
TSUGIO UDAGAWA

BY Craig, Antonelli & Hill

ATTORNEYS

PATENTED SEP 26 1972

INVENTORS
TAKESHI ARAYA AND
TSUGIO UDAGAWA

BY Craig, Antonelli & Hill
ATTORNEYS

DEVICE FOR FEEDING A CONSUMABLE WIRE ELECTRODE TO AN ARC WELDING TORCH

BACKGROUND OF THE INVENTION

1. Field of the Invention

This invention relates to a device for automatically feeding a consumable wire electrode to an arc welding torch from a wire reel located at a remote place.

2. Description of the Prior Art

In a number of welding operations using a consumable wire electrode, it is customary to pay out the wire electrode from a wire reel by the use of a wire feeding means with a couple of rollers engaged with the wire and to feed it to a welding torch through a wire path comprising a hollow flexible conduit tube. In such a system, if the conduit tube is relatively short, the wire feeding means may be positioned at a point intermediate between the wire reel and an arc generating point.

When the wire feeding means is positioned nearer to the wire reel with respect to the conduit tube, it is generally called a feeding means of the push type, while a wire feeding means placed nearer to the arc with respect to the conduit tube is called a feeding means of the pull type.

A longer conduit tube, however, results in an increased feed resistance due to the friction between the wire and the inner surface of the conduit tube. Especially, this problem becomes apparent, when the conduit tube in use is bent. In such a conduit tube, the wire passing through the conduit tube is also bent at the bent portion of the conduit tube and pressed against the inner surface thereof, thereby often greatly increasing the feed resistance. Therefore, the feeding is effected merely by the push mode or by the pull mode, it will cause an overload on the feeding means, the buckling of the wire or no-load rotation of the feeding rollers, with the result that the wire is damaged, making it difficult to feed the wire smoothly. Generally, the maximum distance which allows smooth wire feed with one wire feeding means is about 3 m.

A conventional system intended to feed the wire smoothly over a long distance by overcoming the above-mentioned difficulties employs feeding means of both the push and pull types in one push-pull feeding device. This system is usually provided with two wire feeding means engaged with the wire, one of which functions to draw out the wire electrode from a wire reel and push it into a conduit tube, while the other of the wire feeding means is adapted to pull out the wire electrode from the conduit tube and supply it to the arc. The problem specific to this system is how to operate the two wire feeding means of the push and pull types in correlation with each other. An example of the conventional push-pull type wire feeding means in actual use has a wire feeding means of the push type comprising a pair of rollers which is driven by a motor with a constant-speed characteristic almost vertical in the torque-speed curve, and this feeding means work in cooperation with another wire feeding means of the pull type comprising a pair of rollers which is driven by a motor with a constant torque characteristic almost horizontal in the torque-speed curve, so that the wire feed is determined by the rotational speed of the wire feeding means of the push type. In this system, the wire might be supplied to the arc at a fixed rate, so far as the feeding resistance inside the conduit tube is negligibly small or in a stable state, even if it is large. Actually, however, as a welding worker moves along the welding line with a torch in hand, the conduit tube is bent in various directions, whereby the feeding resistance of the wire passing through the conduit tube varies greatly. As a result, the electrode wire which passes the feeding means of the push type at a fixed speed becomes irregular in speed at the outlet of the conduit tube on the side of the welding torch due to stagnation of wire occurring within the conduit tube, thus making the arc unstable.

Another conventional system of the push-pull type comprises a wire feeding means of the pull type driven by a motor with a constant speed characteristic and a wire feeding means of the push type which is driven by a motor of a relatively low output with a constant torque characteristic. In such a system, the speed at which the wire electrode is supplied to the arc depends on the rotational speed of the wire feeding means of the pull type placed near the arc, thus offering the advantage that the feeding speed is less affected by the above-mentioned variation in feeding resistance. The disadvantage of this system is that a motor with a large output is required for driving the wire feeding means of the pull type, which in turn requires a bulky and heavy welding torch containing the wire feeding means of the pull type and a driving motor, resulting in a low operating efficiency of the torch.

SUMMARY OF THE INVENTION

Accordingly, it is an object of this invention to provide an improved consumable wire electrode feeding system which is capable of supplying the wire electrode to the arc at a fixed rate over a long wire path from a wire reel to a welding torch even if the feed resistance of the path varies greatly in the course of welding work, thereby eliminating buckling and other damage to the wire and protecting the wire feeding means from overload.

Another object of this invention is to provide a consumable wire electrode feeding device of the push-pull type with an improved operating efficiency which includes a light-weight small-sized welding torch housing a wire feeding means of the pull type and a driving motor at the same time.

Still another object of this invention is to provide a consumable wire electrode feeding means of the push-pull type which permits the regulation of the wire feeding speed at will in a wide range at the welding torch side of the device.

Still another object of this invention is to provide a consumable wire electrode feeding device with a simplified feed control system comprising compressed air driven motors as the driving motors for both of the push and pull wire feeding means.

Still another object of this invention is to provide a consumable wire electrode feeding device of the push-pull type in which the feeding torque of the wire feeding means of the push type is easily adjusted in accordance with the type of wire fed.

The wire feeding device according to this invention comprises two wire feeding means of the push and pull types, the former having a pair of rollers driven by a motor with a substantially constant torque characteristic almost horizontal in the torque-speed characteristic curve and the latter being provided with a pair of rollers which is driven by a motor with a substantially constant speed characteristic almost vertical in the torque-speed characteristic curve. A compress-air driven motor is used for at least the wire feeding means of the pull type, and a flow-rate regulating valve is coupled to the exhaustion side of the compressed-air driven motor as a means for giving a desired constant speed characteristic to the motor.

Since, as is well known, the output per unit weight of the compressed-air driven motor is more than 15 times better than that of an electric motor, a compressed-air driven motor of a very small size and weight is capable of producing the same output as that produced by a much larger and heavier electric motor. For this reason, a certain conventional system employs a compressed-air driven motor as a driving motor for the wire feeding means of the pull type contained in the welding torch, and is such a system the wire feeding speed is adjusted by increasing or decreasing the air-feeding pressure of the compressed-air driven motor.

An experiment the inventors conducted, however, shows that the method in which the back pressure is regulated by controlling the exhaust air of the motor while maintaining the constant air feeding pressure of the compressed-air driven motor has the following advantages over the conventional method in which the air-feeding pressure is controlled. In other words, the method according to our experiment results in a higher gradient of the torque-speed characteristics curve, which causes less variation in wire feeding speed according to the variations in load. Also, this method allows a wider range of regulation of wire feeding speed, making it possible to reduce the speed to a level as low as one fifth to one tenth of the maximum speed.

Further, as a result of our experiment, it has been found that, by enlarging the feeding torque of the wire feeding means of the push type to a certain degree, only a little feeding torque is required of the wire feeding means of the pull type, so that a most stable feeding operation is performed without applying an excessive force to the wire when these two wire feeding means are equal or almost equal in feeding torque.

As can be seen from the above description, proper regulation of the back pressure of the compressed-air driven motor for driving the wire feeding means of the pull type and proper distribution of feeding torque between the wire feeding means of the push and pull types make possible stable supply of wire at constant speed by the use of a compressed-air driven motor of a relatively low output for the wire feeding means of the pull type. This also helps to lessen the size and weight of a welding torch housing the wire feeding means of the pull type and a driving motor for greater convenience of operation of the welding torch.

Although the driving motor for the wire feeding means of the push type is in no way limited in type, the use of a compressed-air driven motor as in the feeding means of the pull type simplifies the construction of a control system for performing operations required for starting and stopping the wire. In this case, compressed-air driven motors of the same rated outputs may be employed as the driving motors for the feeding means of both the push and pull types, and the compressed-air driven motor coupled to the wire feeding means of the push type is adapted to generate a desired constant torque characteristic by regulating the air-feeding pressure.

The above and other objects, features and advantages will be made apparent by the detailed description taken in conjunction with the accompanying drawings.

DESCRIPTION OF THE PREFERRED EMBODIMENTS

Figure 1:
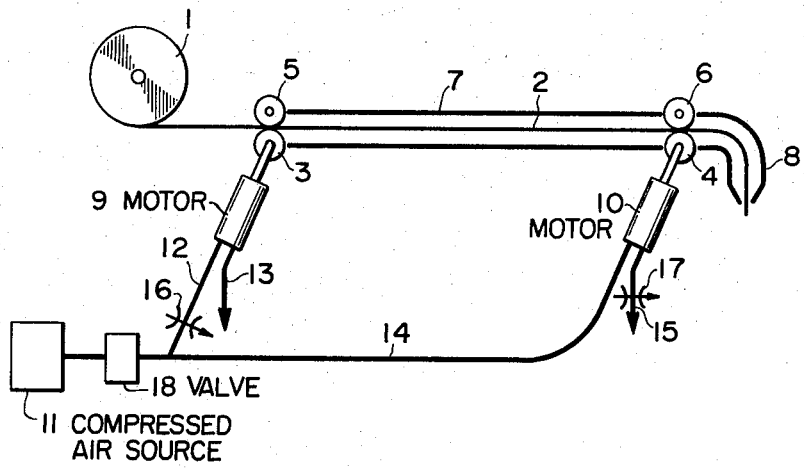
FIG. 1 is a schematic diagram showing an embodiment of this invention.

Referring now to FIG. 1, a consumable wire electrode 2 wound on a reel 1 is introduced through a flexible conduit tube 7 to a welding torch 8 and fed to the arc by way of an end of the welding torch. In order to feed the wire 2, feeding rollers 3 and 4 which mate with pressure rollers 5 and 6 respectively are provided nearer to the reel and the arc respectively for pushing and pulling the electrode wire. The feeding rollers 3 and 4 are coupled to and driven respectively by the compressed-air driven motors 9 and 10 containing decelerators. An air tube 12 and an air exhaust tube 13 are connected with the compressed-air driven motor 9, while an air tube 14 and an air exhaust tube 15 are coupled with the compressed-air driven motor 10, whereby opening the valve 18 causes compressed-air to be supplied to the motors simultaneously from a compressed-air source 11 through the air tubes 12 and 14. A flow rate regulating valve 16 attached to the air tube 12 is provided for the purpose of adjusting the torque generated by the motor 9 in such a manner as to prevent the wire from being buckled. This valve 16 may be omitted if the wire is not liable to buckle. On the other hand, a flow rate regulating valve 17 provided midway in the air exhaust tube 15 is for regulating the back pressure of the motor 10.

Figure 2:
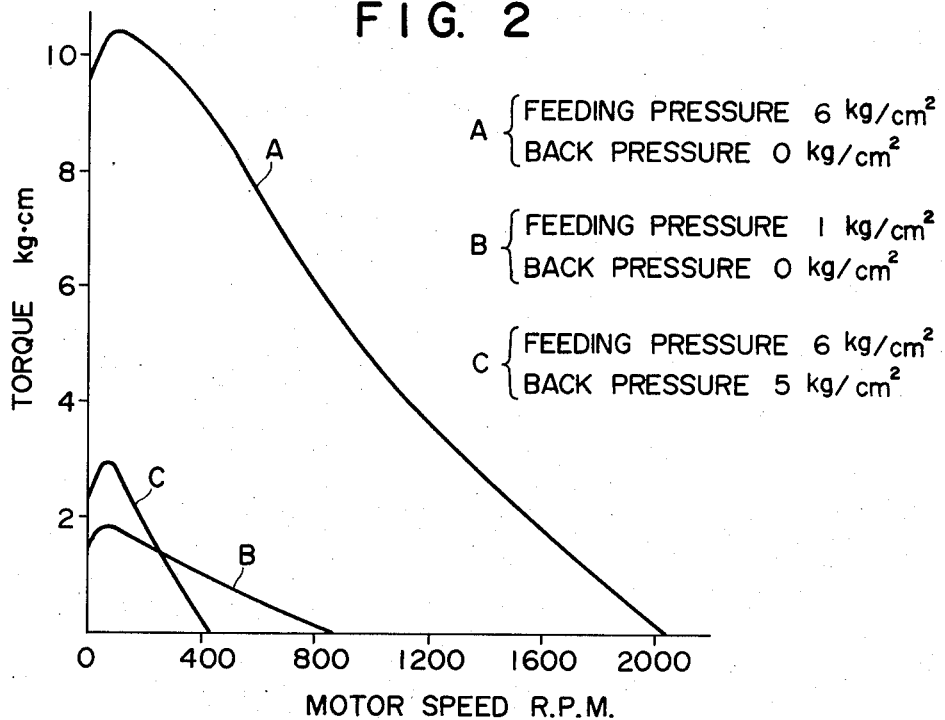
FIG. 2 is a diagram showing an example of the operating characteristic of a compressed-air driven motor employed in this invention.
Figure 3:
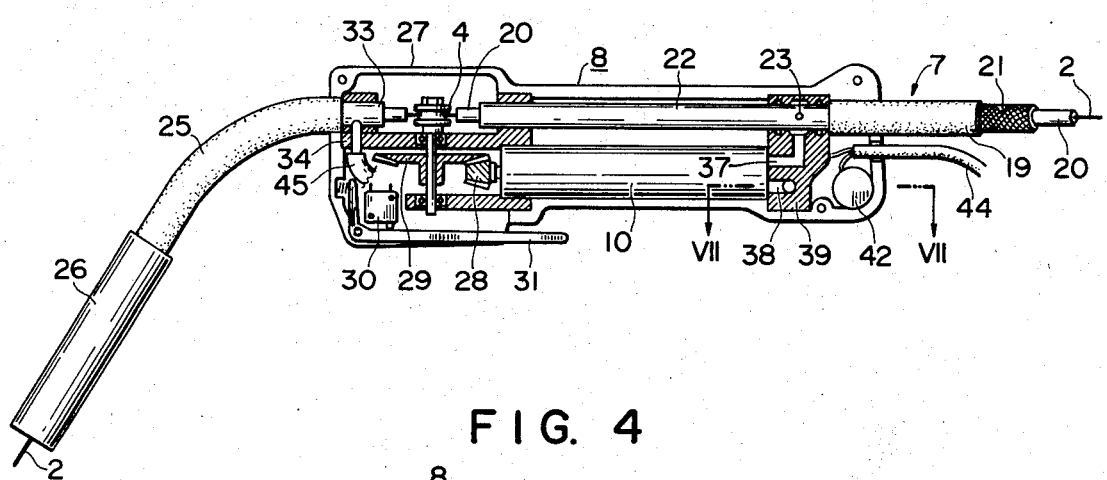
FIG. 3 is a longitudinal sectional view showing an actual example of the welding torch used in the device of this invention.
Figure 4:
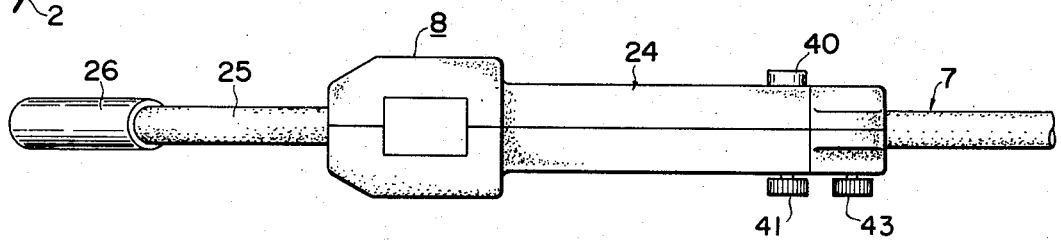
FIG. 4 is a plan view of the welding torch shown in FIG. 3.
Figure 5:
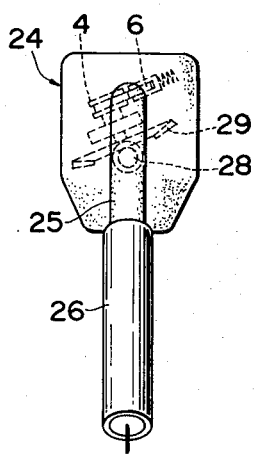
FIG. 5 is a side view of the welding torch shown in FIG. 3.
Figure 6:
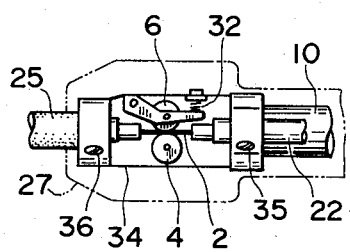
FIG. 6 shows a plan view of the wire feeding means contained in the welding torch.
Figure 7:
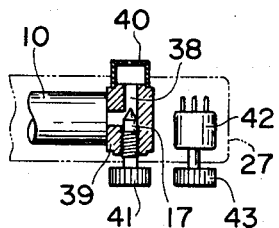
FIG. 7 is a plan view showing a section of the welding torch shown in FIG. 3 taken in the line D—D.

The compressed-air driven motors 9 and 10 are ordinary motors of the rotary slide vane type. An example of the torque-speed characteristic of such compressed-air driven motors is shown in FIG. 2. Curve A in the drawing shows a characteristic with the maximum air feeding pressure and zero back pressure.

A compressed-air driven motor is essentially possessed of a constant torque characteristic. Actually, however, because of the limited area of the exhaust port provided in the casing surrounding the rotor, the flow rate of air through the exhaust port is greater, the greater the rotational speed of rotor, resulting in an increased energy loss at the exhaust port. In addition, increased frictional loss due to rotor rotation causes torque to be reduced as the rotational speed increase as indicated in curve A, and finally the torque becomes zero at a certain level of marginal speed (no-load speed).

Under this condition, when the air feeding pressure is reduced, both the maximum torque and the no-load speed decrease, and as a result the slope of the curve becomes gentle as shown by curve B, nearing a constant torque characteristic. This shows that when the motor speed is low, the speed varies greatly with the variation in load and the motor torque is reduced to such a degree that it is necessary to use a motor of high rated output in order to secure a torque great enough to feed the wire.

The inventors have found that a driving motor with a very desirable characteristic for the wire feeding means of the pull type is obtained when the air exhaust of the compressed-air driven motor is controlled to increase its back pressure while maintaining a constant air feeding pressure of the motor. Curve C of FIG. 2 shows an example of the characteristic as envisaged when the amount of exhaust air is controlled by the flow rate regulating valve 17 on the exhaust side. It will be seen from this curve that a large torque is generated in the neighborhood of zero motor speed when the amount of exhaust air is low, while the torque is sharply reduced due to back pressure as the motor speed rises, with the result that a characteristic near to a constant speed is obtained. Therefore, when the motor speed is low, it varies less than in the case of curve B where the motor speed is regulated by controlling air feeding pressure, thereby making possible a more stable wire feed. Further, since a larger maximum torque is available, it is possible to use a motor with a relatively small rated output, that is, a motor small in size and weight.

In the device of FIG. 1, the air feeding pressure of the compressed-air driven motor 9 for the wire feeding means of the push type is appropriately regulated by means of the flow rate regulating valve 16 thereby obtaining a constant torque characteristic as represented by curve A or B of FIG. 2, and the back pressure of the compressed-air driven motor 10 for the wire feeding means of the pull type is regulated by means of the flow rate regulating valve 17, as already explained, thereby obtaining a constant speed characteristic as shown by curve C of FIG. 2. Although not shown in FIG. 1, a characteristic approaching more to a constant speed is obtained by transmitting the rotation of the motor 10 to the feeding roller 4 after reducing it by one stage more.

In this way, the wire 2 is paid out of the reel 1 at almost constant torque and pushed into the conduit tube 7 by means of the feeding roller 3 of the wire feeding means of the push type, while at the same time it is pulled out of the conduit tube 7 and fed to the welding torch 8 at almost fixed speed by means of the feeding roller 4 of the wire feeding means of the pull type. In other words, the wire is supplied to the arc from the wire reel continuously at constant speed.

An actual example of the construction of the welding torch portion suitable for the device of the invention is shown in FIGS. 3 to 7. The conduit tube 7 has a space between an outer casing 19 and an inner tube 20 and in this space is contained a path of compressed-air and a braided wire 21, while the wire electrode 2 is fed along inside the inner tube 20. The end of the braided wire 21 is electrically connected with a metal sleeve 22 through which the inner tube 20 is extended farther. The path of compressed-air is connected with an opening 23 on the side of the sleeve 22 through the space between the sleeve 22 and the inner tube 20.

The welding torch represented by the reference numeral 8 consists of a torch proper 24 and a curved guide 25 coupled to the front of the torch proper and a nozzle 26. The compressed-air driven motor 10 which is disposed with its center axis in parallel with the direction of wire feed is contained in the handle at the center of the case 27 made of plastic insulating material which in turn contains the torch proper.

The forward part of the case 27 contains the wire feeding means of the pull type which comprises a feeding roller 4, a pressure roller 6, reduction gears 28 and 29, a trigger switch 30 and a trigger lever 31. The feeding roller 4 is driven by the compressed-air driven motor 10 through its output shaft and also through the reduction gears 28 and 29. The pressure roller 6 is pressed against the wire 2 by means of the spring 32, so that rotation of the feeding roller 4 causes the wire 2 to be pulled out of the conduit tube 7 and fed to the nozzle 26 through the curved guide 25. The metal sleeve 32 connected to the braided wire 21 of the conduit tube, together with the metal 33 mounted on the inner surface of the curved guide 25, are fastened with the screws 35 and 36 on a metal bracket 34 supporting the wire feeding means, thus forming a current path from the braided wire 21 to the wire tip in the nozzle 26.

The rear portion of the case 27 contains a valve case 39 provided with air paths 37 and 38 which lead to the inlet and outlet of air of the compressed-air driven motor 10. The compressed-air is supplied to the motor 10 from the opening 23 on the side of the sleeve 22 through the air path 37, while exhaust air from the motor 10 is discharged into atmosphere from the exhaust port 40 through the air path 38.

The flow rate regulating valve 17 which is screwed into the valve case 39 is such that when the knob 41 outside is rotated, the valve 17 moves back or forth to regulate the flow rate of exhaust air passing through the air path 38. As a consequence, the gradient of the characteristic curve C shown in FIG. 2 changes, enabling the wire feeding speed to be controlled at a desired level. In metal arc welding by the use of a DC constant voltage source, the value of welding current varies according to the wire feeding speed, and hence it is possible to regulate the welding current by controlling the flow rate of exhaust air with the knob 41.

The reference numeral 42 shows a voltage regulating element operated by the outside knob 43 for regulating an arc voltage. This element 42, like the trigger switch 30, is connected to the power supply through the control cable 44.

An arc shield gas is supplied to the nozzle 26 from a separate gas pipe 45 through the curved guide 25. The operations of supplying and discontinuing supply of welding current, compressed air and shield gas to the welding torch are all performed by a control system disposed in the neighborhood of the wire reel. When a welding worker pulls a trigger lever 31 to start an welding job, the contact of the trigger switch 30 is closed and the control system connected thereto is energized, thereby supplying compressed-air to the compressed-air driven motors for the wire feeding means of the push and pull types. As a result, the wire feeding roller is driven to start feeding the wire electrode, whereby an arc is generated between a work piece and the tip of the wire electrode supplied from the wire tip in the nozzle 26.

Explanation will be made now of an experiment which has been conducted with the device of the invention. A welding wire of soft steel (DS1 wire made by Kobe Steel) 1.2 mm in diameter was used as the wire electrode to be fed, and the welding operation was performed by the dip transfer type arc welding method in which shield gas of carbon dioxide was supplied at the rate of 15 $l$ per minute. A DC constant voltage source of rated current of 350 A was used, while a welding object was a soft steel plate 10 mm in thickness. A wire feeding means of the push type employed in the experiment consists of a pair of rollers 10 mm in diameter which is coupled to a compressed-air driven motor with the maximum output of 45 watt, no-load revolutions of about 2,000 r.p.m. and air consumption of 134 $l$/min (pressure of 6 kg/cm$^2$). While maintaining the air feeding pressure of the motor at 6 kg/cm$^2$, the wire was paid out from the wire reel and pushed into a flexible conduit tube 10 m long.

A wire feeding means of the pull type which was used in the experiment includes a pair of rollers each 10 mm in diameter which is connected through a reduction gear of the reduction ratio of 4 to 1 to a compressed-air driven motor of a similar type to the one used for the wire feeding means of the push type, so that the wire electrode may be pulled out of the other end of the conduit tube to be fed to the welding torch. While maintaining the air feeding pressure of the compressed-air driven motor of the pull type at 6 kg/cm$^2$, the back pressure was adjusted by means of a flow rate regulating valve coupled to the exhaust side of the motor to such a degree as to reduce the pressure difference between the air inlet and outlet of the motor to a minimum of 1 kg/cm$^2$. Under this condition, the wire was fed at the outlet of the torch at a speed ranging from about 3 to 10 m/min, thereby making possible welding work, with a current range of from 300 A in maximum to 130 A in minimum.

Further, in order to find the effect which bent the conduit tube may have during the welding operation, upon the wire feeding speed, the conduit tube which had been wound in four loop layers 400 mm in diameter was intentionally extended into a form of straight line and then was wound to the original state during the welding work. As a result, it has been found that during the processes of varying the conduit state the wire feeding speed at the pull side underwent an average variation (i.e. the difference between the maximum and minimum speeds) of approximately 0.5 m/min and the maximum variation of 0.85 m/min, which is equivalent to the variation of an average ±5A in welding current and the maximum variation of about ±10A. This shows that practically no adverse effect is produced on the quality of welding work.

In this experiment, the compressed-air driven motor had the weight of 156 gr. while the total weight of the torch containing the wire feeding means was 1.0 kg. In contrast, regulating the speed of the compressed-air driven motor of the pull type only by regulating the air feeding pressure as in the conventional devices requires a compressed-air driven motor at the pull side with the output of 60 watt and weight of about 480 gr., increasing the total weight of the welding torch by about 40 percent.

We claim:

1. In a device for feeding a consumable wire electrode to an arc welding torch comprising a first wire feeding means for drawing the wire electrode out of a wire reel and pushing said wire electrode into a flexible conduit tube and a second wire feeding means for pulling said wire electrode out of said conduit tube and feeding said wire electrode to a welding torch, both of said first and second wire feeding means being engaged with said wire electrode; the improvement wherein said first wire feeding means comprises a pair of rollers driven by a motor having a substantially constant torque characteristic with an almost horizontal torque-speed characteristic curve and said second wire feeding means comprises a pair of rollers driven by a motor having a substantially constant speed characteristic with an almost vertical torque-speed characteristic curve, said motor for driving said second wire feeding means comprising a compressed-air driven motor having such a back pressure as to achieve a substantially constant speed characteristic.

2. A device for feeding a wire electrode according to claim 1, wherein the air exhaust side of said compressed-air driven motor for driving said second wire feeding means is coupled to a throttle valve whereby said back pressure of said motor is regulated at will.

3. A device for feeding a wire electrode according to claim 1, wherein said motor for driving said first wire feeding means comprises a compressed-air driven motor with its air feeding pressure so controlled as to achieve a substantially constant torque characteristic.

4. A device for feeding a wire electrode according to claim 3, wherein a throttle valve is connected between the air feeding side of said compressed-air driven motor for driving said first wire feeding means and a source of compressed-air, whereby the air feeding pressure of said motor is regulated at will.

5. A device for feeding a wire electrode according to claim 2, wherein said pair of rollers of said second wire feeding means, said motor for driving said pair of rollers of said second wire feeding means and said throttle valve coupled to the air exhaust side of said motor are contained in a welding torch.

* * * * *